Aug. 9, 1966 J. L. HENKES, JR 3,265,776

REPRODUCING THERMOPLASTIC RECORDINGS

Filed Dec. 19, 1963

Inventor:
John L. Henkes, Jr.,
by John P. Dellitt
His Attorney.

United States Patent Office 3,265,776

Patented August 9, 1966

3,265,776

REPRODUCING THERMOPLASTIC RECORDINGS

John L. Henkes, Jr., Loudonville, N.Y., assignor to General Electric Company, a corporation of New York Filed Dec. 19, 1963, Ser. No. 331,694
3 Claims. (Cl. 264—1)

Figures 1, 1A, 2:
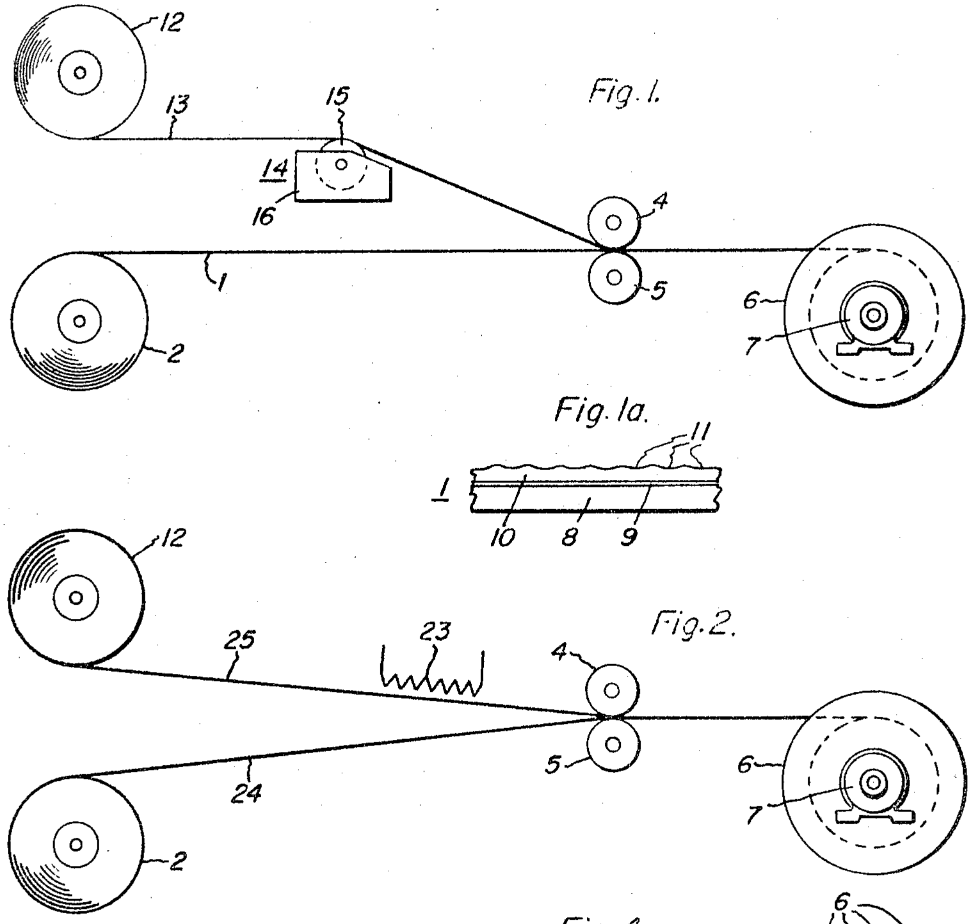

This invention relates to a method for reproducing thermoplastic recording media and particularly to reproducing thermoplastic tape media economically and without employing electronic equipment.

In the copending application of William E. Glenn, Jr., Serial No. 84,424, filed January 23, 1961 (now Patent No. 3,147,062, granted September 1, 1964), a division of William E. Glenn, Jr., Patent No. 3,113,179, granted December 3, 1963, there is described and claimed a medium for recording and in particular an improved medium for recording information by deformation of thermoplastic material. The aforementioned patent describes a method and apparatus for recording upon such a medium. According to the patented method, an electrical input signal acts to establish deformation patterns in a thermoplastic medium. These patterns, which are capable of deflecting or modulating light applied to the medium, are generally in the nature of diffraction phase gratings having a first parameter corresponding to a given color component of an input signal and a second parameter corresponding to the intensity of such component. When properly illuminated in a projection system, the diffraction gratings deflect light around a set of bars to produce an image, for example a pictorial image, corresponding to the recorded information.

Herefore, recordings of the above type have been reproduced electronically. The recorded information is read out, grating element by grating element, employing a television camera tube or the like for scanning the recorded elements consecutively. The information is then re-recorded as an original recording in accordance with the output signal of the television camera tube. While this method of reproduction is quite satisfactory from a technical standpoint, it is of advantage to provide a simpler and more economical method of reproduction.

It is therefore an object of the present invention to provide an improved method for reproducing thermoplastic recording media.

In accordance with a principal embodiment of the present invention, a thermoplastic tape recording is readily duplicated in a flexible plastic tape material. The plastic material in a liquid or semi-liquid state is cast into the deformations of the original thermoplastic recording. This plastic material is then maintained in contact with the thermoplastic recording for a predetermined period of time during which the material sets or solidifies in the form of a negative or inverted version of the thickness deformations in the thermoplastic tape. The solidified flexible material is then stripped from the tape.

In some instances an optically clear or transparent plastic material is preferred for copying because it can be employed directly for deflection of light in the same manner as the original recording. However, if positive copies are desired, the negative copy need not be transparent. Another liquid or semi-liquid and optically clear plastic material is cast into the first material and allowed to set or harden, after which it is stripped from the negative to form a positive copy of the original recording.

Figure 3:
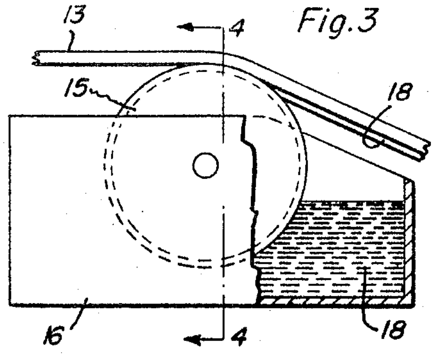
Figure 4:
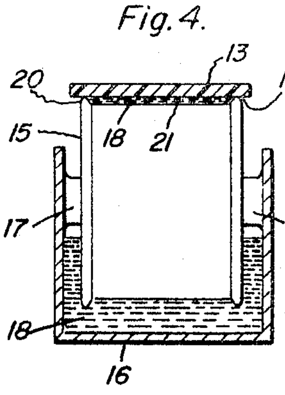
Figure 6:
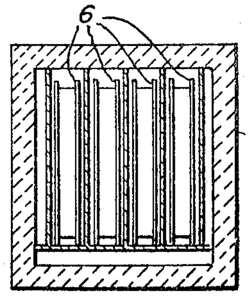
Figure 5:
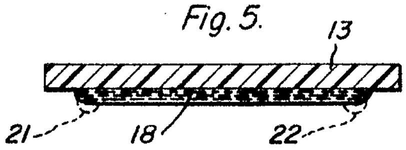

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIG. 1 illustrates a method and apparatus in accordance with the first embodiment of the present invention, FIG. 1*a* is an enlarged view of a thermoplastic recording medium, FIG. 2 illustrates a second embodiment or portion of a method in accordance with the present invention, FIG. 3 is a detailed cross-sectional view of an applicator for applying liquid or semi-liquid material to a moving web or tape of the FIG. 1 embodiment, FIG. 4 is a side cross-section of the FIG. 3 applicator, FIG. 5 is a cross-section of a flexible base with semi-liquid material adhering thereto in accordance with the FIG. 1 embodiment, and FIG. 6 illustrates a drying oven wherein recording duplicates are set or hardened.

FIG. 1 illustrates a first embodiment or process in accordance with the present invention in which a thermoplastic recorded tape 1, originally stored on a reel 2, is drawn through rollers 4 and 5 onto second reel 6 driven by a motor 7. The thermoplastic tape 1 is described and claimed in the aforementioned application Serial No. 84,424, and is also described in the aforementioned Patent No. 3,113,179. Briefly referring to FIG. 1*a*, the thermoplastic recording tape comprises a flexible base layer 8 supporting a conductive layer 9 which in turn is coated with a thermoplastic recording layer 10 having thickness deformations 11 recorded therein. These deformations may be in the form of an information bearing diffraction phase grating. The base 8 is preferably optically clear and smooth and may suitably comprise a 4 mil thickness of optical grade polyethylene terephthalate sold under the name Cronar. The thermoplastic layer 10 is also optically clear having a substantially infinite room temperature viscosity and a relatively fluid viscosity at high temperatures. One example of a thermoplastic material for the recording layer is a blend of polystyrene, m-terephenyl and a copolymer of 95 weight percent butadiene and 5 weight percent styrene. Specifically the composition may be 70 percent polystyrene, 28 percent m-terephenyl and 2 percent copolymer. The thermoplastic layer thickness can vary from about 0.5 mil to several mils. Between the base layer 8 and the thermoplastic recording layer 10 there is located an electrically conducting but preferably transparent layer, for example, a thin cuprous oxide or chromium metal film. The thermoplastic recording layer is oriented in an upwards direction in the FIG. 1 embodiment.

A second reel 12 contains a length of flexible base material 13 in the form of a web or tape, a suitable material being a polyethylene terephthalate known as Cronar. Tape 12 is drawn through rollers 4 and 5 and onto reel 6 in contact with recording tape 1. Just before the base 13 passes between the rollers 4 and 5, an applicator 14 including a reservoir 16 and a wheel or roller 15 contacting the underside of the base tape 13, coats base 13 with a normally-flexible plastic material 18 in a viscous liquid or semi-liquid state. The applicator is shown in greater detail in FIGS. 3 and 4. Applicator wheel 15 is rotatably supported upon bearings 17 immersing the lower portion of wheel 15 in the body of liquid or semi-liquid viscous material 18. As can be seen from the drawing, the applicator wheel 16 is a cylindrical roller having a length slightly less than the width of base 13. The roller is also beveled radially outwards at each end of its cylindrical length contacting base 13 at areas 19 and 20 on either side of the width of base 13, leaving a gap 21 between the central portion of the applicator wheel and base 13. As base 13 is drawn towards reel 6, applicator wheel 15 is caused to rotate bringing liquid or semi-liquid viscous plastic material 18 to the underside of base 13 and coating the underside of base 13 therewith. The resultant coated tape is illustrated in cross-section in FIG. 5. It includes a meniscus of liquid or semi-liquid viscous plastic material 18 adhering thereto to a depth of from about one mil to several mils according to the shape of gap 21. The construction of the applicator in FIGS. 3 and 4 is of considerable advantage in that a smooth flat uniform quantity of material is coated upon the underside of base 13. A completely flat applicator cylinder or roller is found less advantageous in this respect since it would leave a non-uniform coating of material on the base tape 13 frequently including a more extensive deposition or "dogbone" at each end of the roller, as shown dotted at 21 and 22 in FIG. 5.

The material 18 is viscous but is subject to setting by itself or when heated or by some other mechanism, as hereinafter more fully described. As the base 13 is drawn through rollers 4 and 5 the liquid or semi-liquid material 18 is cast into the deformations on the upper side of recording tape 1 between rollers 4 and 5. The material 18 in a non-elastic viscous state therefore forms a negative casting of the thickness deformation on recording tape 1. The two tapes are then rolled up together on reel 6 and stored for a predetermined period of time, for instance in a drying oven as illustrated in FIG. 6, while the material 18 at least partially hardens or sets. After such predetermined period of time, the base 13 including material 18, is stripped from the recording tape 1 before the material 18 becomes too adherent to the recording, providing a complete negative duplicate of the original recorded tape.

The negative duplicate thus formed is capable of being read or projected as set forth in the aforementioned Patent No. 3,113,179, in the same manner as the original tape. However, the negative reproduction may be used as a master tape for manufacturing positive reproductions. In such an instance, the negative duplicate including base 13 and solidified plastic material 18 is reeled onto reel 2 in FIG. 1 whereupon it now takes the position of the original recording. A second base tape 13 contained on reel 12, and similarly provided with a liquid or semi-liquid viscous plastic coating 18 is drawn through rollers 4 and 5 in contact with the negative master whereby the new coating provides a positive copy of the original thickness deformations. Again the copy is stored on reel 6 until layer 18 is at least partially solidified after which it is stripped off.

Numerous materials are suitable as the liquid or semi-liquid viscous plastic material 18 cast upon a recording or negative master. A number of examples are given hereinafter. A negative copy made from the original thermoplastic tape should employ a liquid or semi-liquid viscous material 18 which is optically clear or transparent if the negative record is to be used in a light projection system or the like. However, if the negative recording is regarded as a reproducing master, it need not be optically clear and may even be completely opaque. In any case it should be adherent to base 13 in thicknesses on the order of 0.01 mil to a few mils and should continue to adhere to base 13 when it dries or solidifies, while still retaining its original property of flexibility.

In a particular instance, epoxy-group-containing resins were used as material 18. For transparency, a bispheno-A epichlorohydrin type of resin is suitable. The resin is combined with a catalyst in applicator 14 for the purpose of curing or setting the epoxy resin after a predetermined period of time during which time the copy is maintained in contact with the recording on reel 6.

In one example, Hysol 6010 brand of bis-phenol-A epichlorohydrin resin was combined with diethylene triamine catalyst in applicator 14. The combination is semiliquid at room temperature but hardens or cures with time due to the action of the catalyst. Therefore, the recording tape 1 and base tape 13 having the epoxy resin applied thereto are rolled up together on reel 6, and then placed in the FIG. 6 drying oven for about one hour. To insure curing or hardening of the epoxy resin, the oven is operated at the temperature of 70–80° C. This is a temperature which will solidify the epoxy resin forming a negative duplicate of the original recording, but the temperature is one at which the original thermoplastic recording will not become softened. After about an hour, base 13 carrying the epoxy resin is stripped from the recording tape and may be used for purposes for which the original recording was intended, or it may be employed as a master in the formation of further recordings. In the latter instance, the process is repeated, placing the epoxy negative duplicate on reel 2 and casting a new epoxy recording thereupon. In addition to epoxy resins, various thermosetting resins are also suitable.

A master negative epoxy recording is capable of producing positive duplicates not only in a similar epoxy material but also in other substances which are flexible, transparent and plastic, for example, polybenzyl toluene, polystyrene, or thermoplastic material. Polystyrene may be applied by applicator 14 and may be heated by means not shown to a temperature of approximately 90° C. at which the polystyrene is liquid or semi-liquid. Such heating may take place before and/or during contact with the master. The thermoplastic material may, for example, comprise the same material as the thermoplastic layer containing the original recording as hereinbefore described. The thermoplastic material is also heated to a semi-liquid state either before and/or during contact with the master.

Since it is not essential that the negative recording be transparent if it is to be used as a master for subsequent positive recordings, a non-transparent flexible material is satisfactory. Room temperature vulcanizing silicone rubber compounds, for example, the room temperature curing organopolysiloxane compounds set forth in the Berridge Patent No. 2,843,555 are suitable and especially the material prepared according to the procedure of Example 1 of the Berridge patent. The main component of this room temperature vulcanizing material is fluid methyl polysiloxane having terminal silicon-bonded hydroxyl groups. Various fillers may be incorporated with the aforementioned main component. Among such fillers are for instance titanium dioxide, lithopone, zinc oxide, zirconium silicate, silica aerogel, iron oxide, diatomaceous earth, calcium carbonate, fume silica, precipitated silica, glass fibers, etc. To about 100 parts of the above-mentioned main component, about 70 parts filler may be added. Approximately two parts of tetraethyl silicate are added to this mixture and then in applicator 14, about 0.1 to 5 percent curing catalyst is added. Two percent dibutyl tin dilaurate is a suitable catalyst. The catalyst cures or hardens the plastic material after the plastic material is cast upon the thermoplastic recording tape 1. The plastic material cures or sets in contact with the recording tape either at room temperature or at a slightly elevated temperature. The solidified negative copy is then stripped from the thermoplastic recording tape. Since this negative copy contains the negative impression of the original recording and is quite durable, it may be used as a master in reproducing further copies. Thus, it is placed on a reel 2 as hereinbefore described while another base tape 13 is placed on reel 12 and the two are then drawn together onto reel 7. The organopolysiloxane master attains considerable strength after a period of approximately 24 hours making it useful in the reproduction of a large number of positive copies.

A number of materials may be cast into the organopolysiloxane master. For example, one may use a clear epoxy resin of the type hereinbefore described. Another suitable material is a polycarbonate resin corresponding to the formula:

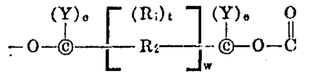

where $R_1$ is hydrogen or a monovalent hydrocarbon radical; $R_2$ is selected from the class consisting of divalent alkylene in alkylidene residues (e.g. methylene, ethylene, propylene, propylidene, isopropylidene, cyclohexylidene), oxygen, etc.; C is the residue of an aromatic nucleus (e.g. benzene naphthalene, biphenyl, nucleus); Y is the substituent selected from the group consisting of: (a) inorganic atoms, (b) inorganic radicals, (c) organic radicals, (a), (b) and (c) being inert to and unaffected by the reagents and the reacting conditions, $e$ is a whole number equal to from 0 to a maximum determined by the number of replaceable nuclear hydrogens substituted on the aromatic hydrocarbon residue C; $t$ is a whole number equal to from 0 to a maximum determined by the number of replaceable nuclear hydrogens $R_2$; and $w$ is a whole number equal to from 0 to 1, inclusive. These compositions and directions for preparing these compositions are set forth in the copending application of Daniel W. Fox, Serial No. 520,166, filed July 5, 1955, and assigned to the assignee of the present invention.

Another suitable material 18 for casting upon the organopolysiloxane negative master hereinbefore described comprises a polyphenylene oxide or an aryl polymer having the general formula

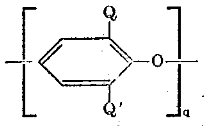

wherein the oxygen atom of one unit is connected to the benzene nucleus of the adjoining unit, $q$ is a positive integer equal, for instance, to at least 10 (e.g., from 100 to 5,000 or more), Q is a monovalent substituent selected from the class consisting of hydrogen, aliphatic hydrocarbon radicals free of a tertiary alpha-carbon atom (e.g., methyl, ethyl, propyl, isopropyl, butyl radicals), halogen (e.g., chlorine, bromine, fluorine), aralkyl, alkaryl, and aryl radicals, Q′ is a monovalent substituent which may be the same as Q and in addition may be a hydrocarbonoxy radical free of an aliphatic tertiary alpha-carbon atom. Examples which Q and Q′ may be correspond to the various examples of radicals which R may be (e.g., alkyl, aryl, aralkyl, alkaryl). Typical examples of monovalent hydrocarbonoxy radicals are, for instance, methoxy, ethoxy, propoxy, butoxy, phenoxy, ethylphenoxy, tolyloxy, radicals. These phenylene polymers may be prepared in various ways. One method comprises oxidizing a phenol represented by the formula:

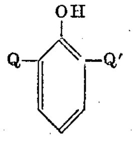

where Q and Q′ have the meanings from above. These phenols are oxidized by passing an oxygen-containing gas (for example, oxygen itself or air) through the particular phenol in the presence of a catalyst system comprising a cuprous salt and a tertiary amine. More specific directions for preparing these polyphenylene ethers as well as examples of starting materials and polymers prepared therefrom are disclosed and claimed in the application of Allan S. Hay, Serial No. 212,128, filed July 24, 1962, as a continuation-in-part of application Serial No. 69,245, filed November 15, 1960, now abandoned, which is, in turn, a continuation-in-part of Serial No. 744,086, now abandoned, and the application of Jack Kwiatek, Serial No. 744,087, now Patent Number 3,134,753, both filed June 24, 1958, and assigned to the same assignee as the present invention.

Another suitable material which may be cast upon the organopolysiloxane master is the thermoplastic material as hereinbefore described, i.e. the material of the thermoplastic layer on the original recording comprising a blend of polystyrene, m-terephenyl and a copolymer of butadiene and styrene. Other thermoplastic materials suitable for this purpose are set forth in Boldebuck Patent No. 3,063,872, granted November 13, 1962, and assigned to the assignee of the present invention. These thermoplastic materials are heated prior to being cast into the organopolysiloxane negative master and/or after contact therewith. The process is illustrated in FIG. 2, wherein like reference numerals refer to like elements hereinbefore described.

The FIG. 2 apparatus rather than including an applicator 14 includes a heating element 23. The heating element may take various suitable forms as described in the aforementioned Glenn Patent No. 3,113,179. An unrecorded thermoplastic tape 25, including one of the above thermoplastic materials upon a Cronar base layer as hereinbefore described, is unwound from reel 12 and heated by heating element 23, rendering the thermosplastic layer semi-liquid. The thermoplastic is then cast into negative master 24 between rollers 4 and 5 after which the two are rolled up together on reel 6. Heating may alternatively take place after the materials are in contact. An advantageous thermoplastic material incorporated upon an unrecorded tape 25 for the purpose of making positive cipies is particularly described in columns 4 through 7 of the aforementioned Boldebuck Patent No. 3,063,872.

It is thus apparent a large number of diverse substances are suitable for a diplicating material for use in accordance with the recording reproduction process of the present invention. The materials recited above are given by way of example and not in a restrictive sense. Other suitable flexible materials which may be cast upon the deformations of an original thermoplastic tape will occur to those skilled in the art. Flexible plastic materials should be somewhat liquid in state at a temperature below the softening temperature of the original recording or master, and, of course, the copying material should not be one capable of chemically dissolving the original thermoplastic recording.

It is preferred the plastic material used for copying be self-setting, for instance a catalytic curing material of the type hereinbefore described. Alternatively, of course, the material used may be one which is liquid or semiliquid when heated to a temperature below the melting temperature of the original thermoplastic recording. Plastic materials are less desirable which require the evaporation of a solvent in order to solidify in the shape and form of the original deformation recording. The evaporation of a solvent hinders rapid solidification especially when the original recording tape and copy tape are rolled up together. It is sometimes desirable to deposit a mold release such as soap or silicone oil upon a recording or master before casting the plastic material thereon especially when the same type of material is used for both master and copy.

Various other alternatives are possible in accordance with the present invention. For example, it is not necessary the liquefied plastic material be coated upon a base 13 in FIG. 1, before such liquefied material is cast onto the original recording. Thus a layer of liquefied plastic material may be spread upon the original recording, as for example recording tape 1 in FIG. 1, and rolled up upon reel 6 for hardening. It then may be stripped from the original recording tape to form a duplicate. The use of a base tape is, however, desirable in that a thinner and more uniform layer of liquefied plastic may be applied thereto with the base 13 providing the necessary strength. Base 13 is also conveniently provided with sprocket holes and the like useful in projector reproduction apparatus.

On the whole use of the base tape forms a more satisfactory combination. The sprocket holes facilitate synchronization of the copy in the projection process in the same manner the original recording was synchronized.

In the present specification and claims, the term "liquefied" or "liquid" is meant to include a semi-liquid or materially-softened material in a viscous state. Such state is a non-elastic state allowing the liquefied material to be cast onto the recording deformations and completely take on the characteristics of such deformations in the form of a duplication thereof, which duplicate will become semi-permanent upon drying, hardening, setting or curing of the material.

While I have shown and described several embodiments of my invention, it will be apparent to those skilled in the art that many other changes and modifications may be made without departing from my invention in its broader aspects; and I therefore intended the appended claims to cover all such changes and modifications as fall within the true spirit and scope of my invention.

What I claim as new and desire to secure by Letters Patent of the United States is:

1. A method for reproducing a thermoplastic tape of the type recording information as thickness deformations in a first thin transparent thermoplastic layer supported by a flexible base layer, which tape is capable of reproducing information by bending of light impinging on said deformations, comprising the steps of applying a liquefied plastic material upon a flexible base thus forming a second tape, rolling the two tapes together so the liquefied plastic material is cast into the deformations of said first thermoplastic layer at a temperature which does not cause softening of said thermoplastic layer, maintaining the tapes in contact for a predetermined period of time to allow solidification of said plastic material in the form of a negative of said thickness deformations, and stripping the second tape from the thermoplastic tape to provide a duplicate tape.

2. A method for reproducing plastic tape of the type recording information as thickness deformations in a first thin transparent plastic layer supported by a flexible base layer, which tape is capable of reproducing information by bending of light impinging on said deformations, comprising the steps of applying a liquefied plastic material upon a flexible base thus forming a second tape, engaging the two tapes so the liquefied plastic material is cast into the deformations of said first plastic layer at a temperature which does not cause softening of said plastic layer, rolling the two tapes together upon a common reel to maintain the tapes in contact for a predetermined period of time to allow solidification of said plastic material in the form of a negative of said thickness deformations, and stripping the second tape from the plastic tape to provide a duplicate tape.

3. A method for reproducing a tape of the type recording information as thickness deformations in a first thin transparent plastic layer supported by a flexible base layer, which tape is capable of reproducing information by bending of light impinging on said deformations, comprising the steps of applying a liquefied first plastic material upon a flexible base thus forming a second tape, engaging the two tapes so the liquefied plastic material is cast into the deformations of said first plastic layer at a temperature which does not cause softening of said thermoplastic layer, rolling the two tapes together upon a common reel to maintain the tapes in contact for a predetermined period of time to allow solidification of said first plastic material in the form of a negative of said thickness deformations, stripping the second tape from the first tape to provide a negative duplicate, applying a liquefied plastic material upon a flexible base comprising a third tape, engaging the second and third tapes so the liquefied plastic material is cast into the deformations of the second tape, rolling the second and third tapes together upon a common reel to maintain the tapes in contact for a predetermined period of time to allow solidification of said plastic material upon said third tape in the form of a positive reproduction of said thickness deformations, and separating the second and third tapes to provide a positive duplicate.

References Cited by the Examiner

UNITED STATES PATENTS

| | | | |
|---|---|---|---|
| 1,524,133 | 1/1925 | Hoskins | 264—213 |
| 2,232,551 | 2/1941 | Merton | 264—220 |
| 2,419,959 | 5/1947 | Landau | 118—258 |
| 2,525,864 | 10/1950 | Carter | 264—212 |
| 2,527,398 | 10/1950 | Chevannes | 264—213 |
| 2,775,954 | 1/1957 | White et al. | 118—258 |
| 3,050,784 | 8/1962 | Jerothe | 264—212 |

ALEXANDER H. BRODMERKEL, *Primary Examiner.*

B. SNYDER, *Assistant Examiner.*